United States Patent Office.

ALLEN C. MAXFIELD, OF BIDDEFORD, MAINE.

Letters Patent No. 110,058, dated December 13, 1870

IMPROVEMENT IN HAIR-RESTORATIVES.

The Schedule referred to in these Letters Patent and making part of the same.

To all whom it may concern:

Be it known that I, ALLEN C. MAXFIELD, of Biddeford, in the county of York and State of Maine, have invented a new and useful Hair-Restorative; and I hereby declare the following to be a full, clear, and exact description thereof, which will enable others to prepare and compound the same.

My invention is a compound composed of tincture of cantharides, tincture of ammonia, and glycerine.

The proportions are as follows:

Two ounces of tincture of cantharides.

Two ounces of tincture of aromatic spirits of ammonia.

Four ounces of glycerine.

These are mixed and placed in a quart vessel, and the vessel then filled with soft water.

The design of this mixture is to promote the growth of the hair, and prevent its falling out, when such is its tendency. It is not claimed as having any tendency to restore color.

The above proportions for one quart will sufficiently indicate the proper method.

What I claim as my invention, and desire to secure by Letters Patent, is—

The above-described compound of ingredients, in the proportions named, for the purposes specified.

ALLEN C. MAXFIELD.

Witnesses:
 WM. H. CLIFFORD,
 HENRY C. HOUSTON.